United States Patent Office 3,364,226
Patented Jan. 16, 1968

3,364,226
METHOD FOR PREPARING PYRIDOXINE AND INTERMEDIATES THEREFOR
Earl M. Chamberlin, Westfield, and Robert B. Currie, Scotch Plains, N.J., assignors to Merck & Co., Inc., Rahway, N.J., a corporation of New Jersey
No Drawing. Filed Oct. 21, 1965, Ser. No. 500,369
20 Claims. (Cl. 260—297)

This invention relates to a method for making pyridine compounds. More particularly it is concerned with a process for the preparation of new 2-methyl-3-hydroxy pyridines having poly alkoxy or aryloxy methane substituents at the 4 and 5 positions. It is also concerned with a process for the conversion of these new 2-methyl-3-hydroxy-4,5-disubstituted pyridines to pyridoxine.

The preparation of pyridoxine by the reaction of oxazoles with derivatives of 2-butene-1,4-diol to produce pyridine intermediates and the subsequent conversion of these intermediates to pyridoxine by several methods has been described in the art. However, these procedures are usually burdensome since they involve a multiplicity of steps and since many of the intermediates are difficult to convert to pyridoxine on a commercial scale. Thus, other processes more suitable for the preparation of vitamin $B_6$ have been sought.

It is an object of this invention to provide an improved process for the preparation of vitamin $B_6$. It is a further object of this invention to provide new 2-methyl-3-hydroxy pyridines having poly alkoxy or aryloxy methane substituents at the 4,5-position which can be easily converted to vitamin $B_6$ by hydrolysis or solvolysis.

Other objects will become apparent from the detailed description of this invention hereinafter provided.

In accordance with the present invention it is now found that vitamin $B_6$ can be readily and conveniently produced by reacting 4-methyl-5-hydrocarbonoxy oxazoles or a 4-methyl-5-cyano oxazole with various bis-ether derivatives of 2-butene-1,4-diol to produce new 2-methyl-3-hydroxy pyridines substituted at the 4,5-position with the corresponding poly alkoxy or aryloxy methane radicals and then converting these intermediates to the desired vitamin $V_6$ by hydrolyzing or solvolyzing them. The reactions for the preparation of vitamin $B_6$ according to the process of this invention can be illustrated as follows:

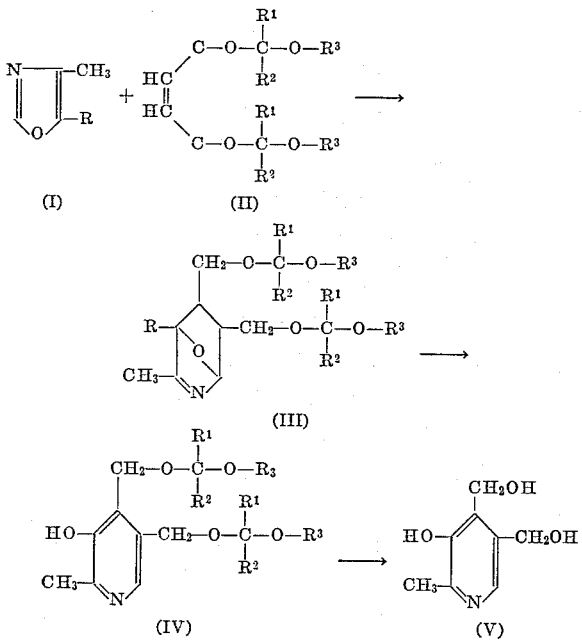

wherein R represents hydrocarbonoxy or cyano; $R^1$ represents hydrogen, alkyl or aryl; $R^2$ represents hydrogen or alkyl and $R^3$ represents alkyl or aryl; and wherein $R^1$ and $R^3$ can be connected together to form a heterocyclic ring.

Thus, in accordance with the foregoing flow sheet the oxazole is reacted with a bis-ether derivative of 2-butene-1,4-diol to produce the corresponding 4,5-disubstituted-2-methyl-3-hydroxy pyridines. The process of the invention can be carried out with a 4-methyl-5-cyanooxazole or with various 4-methyl-5-hydrocarbonoxyoxazoles although generally it is preferred to use those 5-hydrocarbonoxyoxazoles having a hydrocarbon group containing from 1 to 10 carbon atoms since such compounds are readily prepared and produce high yields of the desired 4,5-disubstituted pyridine compounds. Thus, oxazoles wherein the hydrocarbon is a lower alkyl group of from 1 to 10 carbon atoms such as methyl, ethyl, isopropyl, butyl, isobutyl, amyl and octyl, a heterocyclic alkyl such as tetrahydrofurfuryl, an aralkyl group such as benzyl, phenyl ethyl, and aryl groups such as phenyl, tolyl and the like, represent preferred 4-methyl-5-hydrocarbonoxy-oxazoles which can be used in the process of the present invention.

Although derivatives of 2-butene-1,4-diol shown by Formula II above which are reacted with the oxazole to produce the desired pyridine compounds can be those wherein $R^1$ represents a hydrogen, alkyl or aryl group, $R^2$ represents hydrogen or an alkyl group and $R^3$ represents an alkyl or aryl radical, it is preferable to use in this reaction those derivatives of 2-butene-1,4-diol shown by Formula II above wherein the alkyl radicals represented by $R^1$, $R^2$ and $R^3$ are lower alkyl radicals containing from 1 to 6 carbon atoms and wherein the aryl radicals represented by $R^1$ and $R^3$ are phenyl groups. Also in the case wherein $R^1$ and $R^3$ can be connected together to form a heterocyclic ring, it is preferable to use those derivatives wherein this sterocyclic ring has no more than 5 carbon atoms such as, for example, compounds like 1,4-bis(2-tetrahydropyranyloxy)-2-butene or 1,4-bis(2-tetrahydrofuryloxy)-2-butene. Thus, some of the preferred compounds would be, for example: 1,4-bis-(methoxymethoxy) - 2-butene, 1,4-bis(2-methoxy-2-propoxy)-2-butene, 1,4-bis(phenoxymethoxy)-2-butene, 1,4-bis(1-methoxybenzyloxy)-2-butene and the like. The radicals represented by $R^1$, $R^2$ and $R^3$ can be similar or dissimilar. For example, 1,4-bis(2-methoxy-2-propoxy)-2-butene represents a compound of Formula II wherein $R^1$, $R^2$ and $R^3$ all represent methyl groups.

The reaction between the oxazole and the bis-ether derivative of 2-butene-1,4-diol is effected by intimately contacting a mixture of the reactants for a sufficient time to complete the reaction. The reaction between the bis-ether derivative of 2-butene-1,4-diol and the oxazole can be carried out at temperatures from approximately 50° C. to approximately 200° C. although at temperatures from approximately 50° C. to approximately 100° C. the reaction is slow and will take a longer time to complete than if it is carried out at the higher temperature. At a temperature of 175° C. the reaction will be completed in about 4 to 6 hours. It is preferable, however, to carry out the reaction at a temperature of approximately 135° C. to 175° C. and at this temperature range the reaction is complete in about 1 to 10 days. The reaction can be conveniently carried out using an excess of the particular bis-ether derivatives of 2-butene-1,4-diol as a solvent for the reaction process or in the presence of a suitable solvent such as methanol, benzene and the like.

The 2 - methyl - 3 - hydroxy-4,5-disubstituted pyridines (IV) obtained according to this process can be easily converted to pyridoxine (vitamin $B_6$) by treatment with an acid in the presence of water or alcohol. Thus, the 4,5-substituted side chain of the 2-methyl-3-hydroxy pyridines (IV) can be hydrolyzed in the presence of an inorganic aqueous acid such as hydrochloric acid, sulfuric acid, p-toluenesulfonic acid and the like, to produce pyridoxine. Alternatively, the cleavage of the 2-methyl-3-hydroxy-4,5-disubstituted pyridines to form pyridoxine can be accomplished by an acid catalyzed solvolysis in a non aqueous hydroxylic solvent such as methanol, ethanol and the like. The hydrolysis or solvolysis of the 2-methyl-3-hydroxy-4,5-disubstituted pyridines to prepare pyridoxine can be accomplished without isolating the 2-methyl-3-hydroxy-4,5-disubstituted pyridines from the reaction mixture. Thus, it is preferred to hydrolyze or solvolyze the reaction mixture containing the 2-methyl-3-hydroxy-4,5-disubstituted pyridines directly when a solvent is used to effect the reaction initially or to dissolve the reaction-product is an appropriate solvent as described above to effect the hydrolysis or solvolysis.

The intermediate 2-methyl-3-hydroxy-4,5-disubstituted pyridines can be isolated at this point by procedures known in the art such as distilling off unreacted starting materials and any solvent under reduced pressure, distilling off the intermediate under high vacuum and recrystallizing the distillate from a suitable solvent such as hexane to obtain essentially pure intermediates.

In a preferred embodiment of this invention the hydrolysis or solvolysis of the 2-methyl-3-hydroxy-4,5-disubstituted pyridines can be carried out in an alcoholic or aqueous hydrogen chloride solution to produce pyridoxine hydrochloride directly.

In preparing the 2-methyl-3-hydroxy-4,5-disubstituted pyridine compounds in accordance with the present invention, the initial product formed by the reaction of the oxazole and the derivatives of 2-butene-1,4-diol under certain conditions is apparently an adduct which can be represented by the formula:

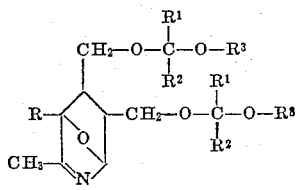

which formula is also shown as (III) of the flow sheet, wherein R, $R^1$, $R^2$ and $R^3$ are the same as defined above. This adduct appears to be formed as a reaction product and is cleaved to form the desired pyridine derivative (IV) when the reaction product is treated with an acid. This cleavage also occurs to some extent in the condensation medium itself especially at higher temperatures of approximately 100° C. or above. It should, of course, be understood that this explanation of the course of the reaction involving the intermediate adduct is based on our present knowledge of the reaction and the explanation does not exclude the possibility that the proposed structure of the adduct is, in fact, incorrect. Accordingly, we do not wish to be bound by these theoretical considerations however likely they may appear to be in light of our present knowledge.

The following examples will illustrate various methods of producing 2-methyl-3-hydroxy pyridines by the proceduce of the present invention. Examples for the preparation of the various bis-ether derivatives of 2-butene-1,4-diol will also be shown. It should be understood, of course, that these examples represent illustrations of the invention and should not be construed as limitations thereof.

EXAMPLE 1

*Preparation of 4,5-bis(methoxymethoxymethyl)-2-methyl-3-pyridinol and then pyridoxine by hydrolysis*

A mixture of 1.27 g. (.010 mole) of 4-methyl-5-ethoxyoxazole and 10.6 g. (0.06 mole) of 1,4-bis(methoxymethoxy)-2-butene prepared as described below is sealed in a glass tube and heated in an oil bath at 143° C. for 20 hours. The resulting reaction mixture containing 4,5-bis(methoxymethoxymethyl)-2-methyl-3-pyridinol is removed from the cooled tube, diluted to 100 ml. with methanol, then to 600 ml. with 0.1 N aqueous hydrochloric acid and refluxed for two hours. The solution is concentrated under reduced pressure, first on a water aspirator, subsequently on an oil pump at 1.5 mm. Hg pressure to a weight of about 4 g. The resulting residual thick oil is diluted with 5 ml. of absolute ethanol and acidified with an additional 5 ml. of 10 M ethanolic hydrogen chloride. On standing at 5° overnight, vitamin $B_6$ hydrochloride crystallizes out and is recovered by filtration. The product so obtained melts at 195.5° C. to 197.5° C. Recrystallization from water and then from absolute ethanol raises the melting point to 206° C. to 206.5° C., which is not depressed upon mixing with authentic vitamin $B_6 \cdot HCl$. The infrared and ultraviolet spectra and the $R_f$ value on the thin layer chromatography on silica gel are all identical with those of authentic vitamin $B_6$ hydrochloride.

In a similar experiment to that described above a mixture of 1.27 g. (0.010 mole) of 4-methyl-5-ethoxy-oxazole and 10.6 g. (0.06 mole) of 1,4-bis(methoxymethoxy)-2-butene prepared as described below is sealed in a glass tube and heated in an oil bath at 143° C. for 20 hours. Upon transfer of the resulting reaction solution to a suitable vessel, excess 1,4-bis(methoxymethoxy)-2-butene is distilled off under reduced pressure and then 4,5-bis(methoxymethoxymethyl)-2-methyl - 3 - pyridinol is obtained by fractionating the remaining mixture at 0.2 mm. Hg pressure. The crude 4,5-bis(methoxymethoxymethyl)-2-methyl-3-pyridinol is recrystallized from hexane to yield essentially pure 4,5-bis(methoxymethoxymethyl)-2-methyl-3-pyridinol having a melting point of 63–65° C. and having an ultraviolet absorption ($\lambda_{max}$) of 292 m$\mu$ in 0.1 mole HCl with $E_{1\ cm.}^{1\%}$ of 355

*Preparation of 1,4-bis(methoxymethoxy)-2-butene*

One hundred ml. (107 g., 1.33 moles) of chloromethyl-methyl ether is added to 600 ml. of pyridine with vigorous stirring over a period of 45 minutes. During the addition, the temperature rises to 90° C. To the resulting slurry is added 30 g. (0.34 mole) of 2-butene-1,4-diol dropwise over a ½-hour period. The mixture is heated to reflux, held there for two hours, cooled to 25° C. and filtered. The filtrate is concentrated under reduced pressure to a small volume and 300 ml. of ethyl ether is added. The precipitated solids are removed by filtration and the filtrate washed with 100 ml. of 10% sodium carbonate solution. The solvent is distilled off under vacuum and the product vacuum-fractionated at 2 mm. pressure. The bis-methoxymethyl ether of 2-butene-1,4-diol obtained boils at 68° C. at 1.9 mm. pressure.

EXAMPLE 2

*Preparation of 4,5-bis(methoxymethoxymethyl)-2-methyl-3-pyridinol and then pyridoxine by solvolysis*

A mixture containing 2.54 g. (0.02 mole) of 4-methyl-5-ethoxyoxazole and 10.57 g. (.06 mole) of 1,4-bis(methoxymethoxy)-2-butene prepared as described in Example 1, is heated in a sealed tube at 135° C. for 16 hours. The resulting reaction mixture containing 4,5-bis-(methoxymethoxymethyl) - 2 - methyl - 3 - pyridinol is removed from the cooled tube and a 0.155 g. aliquot is then taken up in 5 ml. of a 2 N solution of anhydrous hydrogen chloride in dry methanol. The mixture is heated at 55° C. for one hour and cooled. The presence of vitamin $B_6$ in this solution is shown by the appearance of a U.V. absorbing spot of the thin layer chromatography on silica gel in the system benzene-methanol-acetone-acetic acid as well as by paper strip chromatography.

EXAMPLE 3

*Preparation of 4,5-bis(methoxymethoxymethyl)-2-methyl-3-pyridinol and then pyridoxine*

A run is made in a sealed tube as described in Example 1 except that it is heated for 4 hours at 175° C. After hydrolysis with hydrochloric acid as described in Example 1, an aliquot of the 0.1 N hydrochloric acid solution is neutralized with sodium bicarbonate and quantitatively chromatographed on paper using pH 7 aqueous borate buffer as stationary phase and n-butanol as mobile phase. After development for 16 hours the paper is dried and the spot having the same $R_f$ as authentic vitamin $B_6$ cut out, eluted from the paper with aqueous pH 7 borate buffer and its ultraviolet absorption spectrum determined to be identical with those of authentic vitamin $B_6$ in this medium.

The process of this example and of Examples 1 and 2 can be similarly carried out using other oxazoles in place of 4-methyl-5-ethoxyoxazole such as other 5-loweralkoxyoxazoles, for example, the 5-amyloxyoxazole or other oxazoles such as 4-methyl-5-phenyloxyoxazole, 4-methyl-5-benzyloxyoxazole, 4-methyl-5-phenylethyloxyoxazole, 4-methyl-5-tolyloxyoxazole, and 4-methyl-5-tetrahydrofurfuryloxyoxazole to produce the pyridinol compound and then vitamin $B_6$.

EXAMPLE 4

*Preparation of 4,5-bis(methoxymethoxymethyl)-2-methyl-3-pyridinol and then pyridoxine with 4-methyl-5-cyanooxazole*

A mixture of .0935 g. of 4-methyl-5-cyannoxazole and 0.914 g. of 1,4-bis(methoxymethoxy)-2-butene is heated in a sealed tube in an oil bath at 135° C. for 12 days. The resulting reaction mixture containing 4,5-bis(methoxymethoxymethyl)-2-methyl-2-pyridinol is then removed from the cooled tube, dissolved in dioxane and made up to a volume of 10.0 ml. with dioxane. A 2.0 ml. aliquot of this solution is heated for 2 hours at 90° C. in 5 ml. of 0.1 N aqueous hydrochloric acid, cooled and made up to a volume of 10.0 ml. with this same solvent. An aliquot of this solution is paper chromatographed overnight in the system n-butanol:pH 7 aqueous borate buffer on the same sheet as a sample of authentic vitamin $B_6$. After drying the paper, an ultraviolet absorbing spot is observed, with exactly the same $R_f$ as that of the authentic vitamin $B_6$. This spot is eluted from the paper with 5 ml. of pH 7 borate buffer. The U.V. absorption spectrum of this eluate is identical with that of authentic vitamin $B_6$ in this medium.

EXAMPLE 5

*Preparation of 4,5-bis(methoxymethoxymethyl)-2-methyl-3-pyridinol and then pyridoxine using 4-methyl-5-isopropoxyoxazole*

A mixture of 1.41 g. (.01 mole) of 4-methyl-5-isopropoxyoxazole prepared as described below and 5.3 g. (0.03 mole) of 1,4-bis(methoxymethoxy)-2-butene is heated in a sealed tube in an oil bath at 135° C. for 48 hours. After the tube is cooled and opened the excess and unreacted reagents are removed from the mixture by vacuum distillation at 2 mm. pressure to a temperature of 130° C. The residue containing 4,5-bis(methoxymethoxymethyl)-2-methyl-3-pyridinol is then taken up in 100 ml. of 0.1 N aqueous hydrochloric acid and heated at 90° C. for two hours. This solution is then concentrated under vacuum at a pressure of about 20 mm. Hg to a small volume and then cooled at −5° C. overnight. Crystals of crude vitamin $B_6$ hydrochloride are deposited and filtered off. Recrystallization from a small amount of water yields pure vitamin $B_6$ hydrochloride, identified by the criteria described in Examples 1 and 4.

To prepare the 4-methyl-5-isopropoxyoxazole employed above, a well-stirred mixture of 14.2 g. of phosphorous pentoxide, 10 g. of diatomaceous earth, 3.98 g. of isopropyl N-formyl-α-alaninate and 100 ml. of chloroform is heated at reflux for two hours, cooled and poured into a cold solution of 22.4 g. of potassium hydroxide in 100 ml. of water. The solids are filtered off, the layers are separated and the water layer is re-extracted with 25 ml. of additional chloroform. The combined chloroform extracts are stripped of solvent at 100 mm. pressure and the 4-methyl-5-isopropoxyoxazole isolated by distillation. The 4-methyl-5-isopropoxyoxazole has a boiling point of 100° C. at 100 mm. Hg pressure.

EXAMPLE 6

*Preparation of 4,5-bis(methoxymethoxymethyl)-2-methyl-3-pyridinol and then pyridoxine*

A mixture of 1.08 g. (.01 mole) of 4-methyl-5-cyanooxazole and 10.6 g. (0.6 mole) of 1,4-bis(methoxymethoxy)-2-butene is heated in a small bomb at 175° C. for 40 hours. The resulting solution containing 4,5-bis(methoxymethoxymethyl)-2-methyl-3-pyridinol is removed from the cooled tube and stripped of unreacted 1,4-bis(methoxymethoxy)-2-butene by vacuum distillation at 1 mm. Hg pressure by heating to a temperature of 120° C. The residue is then taken up in 50 ml. of a 0.1 N aqueous hydrochloric acid and heated at 90° C. for two hours. Upon concentration to a small volume and cooling to −5° C., crystals of crude vitamin $B_6$ hydrochloride are deposited. These are filtered off and twice recrystallized from hot water to yield pure vitamin $B_6$ hydrochloride, which is identical with an authentic sample in melting point, mixed melting point, and U.V. and I.R. spectral comparisons.

EXAMPLE 7

*Preparation of 2-methyl-4,5-bis[(2-tetrahydropyranyloxy)methyl]-3-pyridinol and then pyridoxine using 4-methyl-5-ethoxyoxazole*

A mixture of 0.127 g. (.001 mole) of 4-methyl-5-ethoxyoxazole and 2.56 g. (.010 mole) of 1,4-bis(2-tetrahydropyranyloxy)-2-butene prepared as described below is heated in a sealed tube at 175° C. for 19 hours. The resulting solution containing 2-methyl-4,5-bis[(2-tetrahydropyranyloxy)methyl]-3-pyridinol is removed from the cooled tube and refluxed for 1 hour in 15 ml. of absolute ethanol containing 0.05 g. of p-toluenesulfonic acid. After dilution of 25 ml. with ethanol, a 10 ml. aliquot is combined with 5 ml. of 0.1 M hydrochloric acid and heated on the steam bath for an additional 40 minutes. This solution is neutralized with solid sodium bicarbonate, stripped to dryness under reduced pressure, taken up in methanol, the insoluble salts filtered out and the resulting solution quantitatively chromatographed on paper as described in Example 4 to give pyridoxine.

*Preparation of 1,4-bis(2-tetrahydropyranyloxy)-2-butene*

To a well-stirred mixture of 44.0 g. (0.5 mole) of butenediol and 168.2 g. (2.0 mole) of 2,3-dihydropyran is added a few drops of concentrated hydrochloric acid. At this point the two phases quickly become miscible and an ice bath is required initially to hold the temperature below 40° C. The reaction mixture is held at room temperature for 24 hours. The acid solution is neutralized with a few pellets of sodium hydroxide, the excess dihydropyran removed by distillation at atmospheric pressure and the product vacuum-distilled at about 2 mm. pressure to yield 100 g. of 1,4-bis(2-tetrahydropyranyloxy)-2-butene which has a boiling point of 144–150° C. at 2 mm. Hg pressure.

The process of this example can be similarly carried out using other oxazoles in place of 4-methyl-5-ethoxy oxazole such as other 5-lowerakoxyoxazoles, for example, the 5-isopropoxyoxazole or the 5-amyloxyxazole or other oxazoles such as 4-methyl-5-phenyloxyoxazole, 4-methyl-5-benzyloxyoxazole, 4-methyl-5-phenylethyloxyoxazole, 4- methyl-5-tolyloxyoxazole, and 4-methyl-5-tetrahydrofurfuryloxyoxazole to produce the pyridinol compound and then vitamin B₆.

EXAMPLE 8

*Preparation of 2-methyl - 4,5 - bis[(2-tetrahydropyranyloxy)methyl]-3-pyridinol and then pyridoxine using 4-methyl-5-cyanooxazole*

A mixture of 0.108 g. (.001 mole) of 4-methyl-5-cyanooxazole and 1.28 g. (.005 mole) of 1,4-bis(2-tetrahydropyranyloxy)-2-butene is heated in a sealed tube at 160° C. for 80 hours. The resulting solution containing 2-methyl-4,5 - bis[(2-tetrahydropyranyloxy)methyl] - 3 - pyridinol is removed from the cooled tube, taken up in 10 ml. of ethanol and diluted to 50 ml. with 0.2 M aqueous hydrochloric acid. The solution is then heated at reflux for three hours. An aliquot of the solution is then neutralized with solid sodium carbonate to pH 7 and chromatograped on paper in the n-butanol pH 7 borate buffer system described in Examples 3 and 4. The developed chromatogram shows a U.V. absorbing spot with the same $R_f$ as a controlled sample of authentic vitamin B₆ and upon elution the same ultraviolet absorption spectrum.

EXAMPLE 9

*Preparation of 2-methyl-4,5-bis[(2-tetrahydrofuryloxy)-methyl]-3-pyridinol and then pyridoxine*

A mixture of 0.127 g. (.001 mole) of 4-methyl-5-ethoxyoxazole and 2.28 g. (.010 mole) of 1,4-bis(2-tetrahydrofuryloxy)-2-butene prepared as described below is heated in a sealed tube at 175° C. for 19 hours. The resulting solution containing 2-methyl-4,5-bis[(2-tetrahydrofuryloxy)methyl]-3-pyridinol is removed from the cooled tube, taken up in 2 ml. of methanol, diluted with 60 ml. of 0.1 molar aqueous hydrochloric acid and held at reflux for two hours. The solution is neutralized with sodium bicarbonate and chromatographed on paper as described in Example 4. The developed chromatogram shows the presence of vitamin B₆.

*Preparation of 1,4-bis(2-tetrahydrofuryloxy)-2-butene*

A mixture of 44.0 g. (.5 mole) of butenediol and 140 g. (2.0 mole) of 2,3-dihydrofuran is treated with a few drops of hydrochloric acid as described in Example 7. After aging as described in Example 7 also, the product is isolated by vacuum-distillation at 2 mm. pressure.

The process of this example can be similarly carried out using other oxazoles in place of 4-methyl-5-ethoxyoxazole such as the 4-methyl-5-cyanooxazole or a 4-methyl-5-loweralkoxyoxazole such as for example, the 5-isopropoxyoxazole or other oxazoles such as 4-methyl-5-benzyloxyoxazole, 4-methyl-5-phenyloxyoxazole, 4-methyl-5-tolyloxyoxazole and 4-methyl-5-tetrahydrofurfuryloxy-oxazole to produce the pyridinol intermediate and then vitamin B₆.

EXAMPLE 10

*Preparation of 4,5-bis[(1-methoxyethoxy)methyl]-2-methyl-3-pyridinol and then pyridoxine*

A mixture of 1.27 g. (0.01 mole) of 4-methyl-5-ethoxyoxazole and 12.3 g. (.06 mole) of 1,4-bis(1-methoxyethoxy)-2-butene prepared as shown below is heated in a sealed tube at 145° C. for 24 hours. The tube is cooled and opened and excess dienophile and other volatiles removed from the reaction mixture by distillation at 1 mm. Hg pressure to a temperature of about 125° C. The residue containing 4,5 - bis[(1 - methoxyethoxy)methyl] - 2-methyl-3-pyridinol is taken up in 50 ml. of 0.1 N hydrochloric acid and the acidity readjusted to pH 1 by addition of a small amount of concentrated HCl. This solution is heated and held at 90° C. for 2 hours. The presence of vitamin B₆ hydrochloride in this solution is shown by paper-strip chromatography as described in Example 4. The product may be isolated from the solution by concentration to a small volume, cooling to below 0° C., seeding and filtering the crystals of crude vitamin B₆ hydrochloride which form. Recrystallization from water yields pure vitamin B₆ hydrochloride, identical with an authentic sample by the usual criteria of melting points, identity of chromatographic $R_f$'s and of U.V. and I.R. absorption spectra.

*Preparation of 1,4-bis(1-methoxyethoxy)-2-butene*

120 grams (2.07 mole) of vinyl methyl ether is added dropwise over a 1-hour period to a mixture of 88 grams of 2-butene-1,4-diol and a few drops of sulfuric acid in a well-stirred flask, with the temperature being held between approximately 5–10° C. with external cooling. The reaction mixture is then neutralized with potassium carbonate and stirred overnight. The mixture is then filtered and the filtrate vacuum distilled to produce the desired product. The 1,4-bis(1-methoxyethoxy)-2-butene produced has a boiling point of 46–47° C. at 0.1 mm. pressure. It also has a refractive index of 1.4312 at 22° C.

The process of this example can be similarly carried out using other oxazoles in place of 4-methyl-5-ethoxyoxazole such as the 4-methyl-5-cyanooxazole or any 4-methyl-5-loweralkoxyoxazole, for example, the 5-isopropoxyoxazole or other oxazoles such as 4-methyl-5-phenyloxyoxazole, 4-methyl-5-benzyloxyoxazole, 4-methyl-5-tetrahydrofurfuryloxyoxazole, 4 - methyl-5-phenylethyloxyoxazole and 4-methyl-5-tolyloxyoxazole to produce the pyridinol intermediate and then vitamin B₆.

EXAMPLE 11

*Preparation of 4,5-bis[(2-methoxy-2-propoxy)methyl]-2-methyl-3-pyridinol and then pyridoxine*

Following the procedure of Example 10 but using 13.9 g. (.06 mole) of 1,4-bis(2-methoxy-2-propoxy)-2-butene prepared as described below in place of 1,4-bis(1-methoxyethoxy)-2-butene, there is produced 4,5-bis[(2-methoxy-2-propoxy)methyl]-2-methyl-3-pyridinol and then pyridoxine.

*Preparation of 1,4-bis(2-methoxy-2-propoxy)-2-butene*

One mole (108.6 g) of α-chloroisopropyl methyl ether is added over a 45 minute period to 450 ml. of pyridine in a well-stirred flask holding the temperature below 30° C. with external cooling. To the resulting solution is added 22 grams (0.02 mole) of 2-butene-1,4-diol over a ½-hour period. The mixture is heated and held at reflux for 2 hours and then cooled to 24° C. and filtered. The filtrate is concentrated in vacuo to a small volume and 300 ml. of ethyl ether is then added. The solution is filtered and washed with 100 ml. of 10% sodium carbonate solution. The solvent is distilled off and the residue vacuum concentrated at 1 mm. Hg pressure to yield 1,4-bis(2-methoxy-2-propoxy)-2-butene.

EXAMPLE 12

*Preparation of 4,5-bis[(1-ethoxyethoxy)methyl]-2-methyl-3-pyridinol and then pyridoxine*

Following the procedure of Example 10 but using 13.9 g. (0.06 mole) of 1,4-bis(1-ethoxyethoxy)-2-butene prepared as described below in place of 1,4-bis(1-methoxymethoxy)-2-butene there is produced 4,5-bis[(1-ethoxyethoxy)-methyl]-2-methyl-3-pyridinol and then pyridoxine.

*Preparation of 1,4-bis(1-ethoxyethoxy)-2-butene*

Approximately 36 grams of vinyl ethyl ether is added gradually to a mixture of 22 grams of 2-butene-1,4-diol and a few drops of sulfuric acid over a 1-hour period in a well-stirred flask with the temperature maintained at 5–15° C. The reaction mixture is then neutralized with potassium carbonate and stirred overnight. The mixture is then filtered and the filtrate vacuum distilled to produce the desired product. The 1,4-bis(1-ethoxyethoxy)-2-butene produced has a boiling point of 67–70° C. at 0.1 mm. pressure and a refractive index of 1.4310 at 25° C.

The process of this example can be similarly carried out using other oxazoles in place of 4-methyl-5-ethoxyoxazole such as the 4-methyl-5-cyanooxazole or any 4-methyl-5-loweralkoxyoxazole, for example, the 5-isopropoxyoxazole or other oxazoles such as the 4-methyl-5-phenyloxyoxazole, 4-methyl-5-benzyloxyoxazole, 4-methyl-5-tetrahydrofurfuryloxyoxazole, 4-methyl - 5 - phenylethyloxyoxazole and 4-methyl-5-tolyloxyoxazole to produce the pyridinol intermediate and then vitamin $B_6$.

EXAMPLE 13

*Preparation of 2-methyl-4,5-bis[(phenoxymethoxy) methyl]-3-pyridinol and pyridoxine*

A mixture of 1.27 g. (0.01 mole) of 4-methyl-5-ethoxyoxazole and 15.0 g. (0.03 mole) of 1,4-bis(phenoxymethoxy)-2-butene prepared as described below is heated at 170° C. is a sealed tube for six hours. The tube is cooled and opened. The residue, containing 2-methyl-4,5-bis[(phenoxymethoxy)methyl]-3-pyridinol is dissolved in 100 ml. of methanol and acidified with concentrated hydrochloric acid to a pH of about one. The mixture is refluxed for four hours and cooled. The presence of vitamin $B_6$ hydrochloride in this solution is indicated by paper-strip chromatography of an aliquot in butanol:borate buffer as described in Example 4.

*Preparation of 1,4-bis(phenoxymethoxy)-2-butene*

One-tenth mole (18.5 g.) of 1,4-bis(chloromethoxy)-2-butene is slowly added over 30 minutes with good stirring to a mixture of 25.5 g. (0.22 mole) of sodium phenoxide in 75 ml. of tetrahydrofuran. The temperature during this addition is kept below 40° C. The mixture is then heated under reflux for two hours and cooled. The solids are filtered off, the solvent distilled off under vacuum and the 1,4-bis(phenoxymethoxy)-2-butene then isolated by high vacuum distillation at 0.1 mm. Hg pressure.

EXAMPLE 14

*Preparation of 4,5-bis[(α-methoxybenzyloxy)methyl]-2-methyl-3-pyridinol and then pyridoxine*

Following the procedure of Example 13 but using 19.7 g. (0.06 mole) of 1,4-bis(α-methoxybenzyloxy)-2-butene prepared as described below in place of 1,4-bis(phenoxymethoxy)-2-butene there is produced 4,5-bis[(α-methoxybenzyloxy)methyl]-2-methyl-3-pyridinol and then pyridoxine.

*Preparation of 1,4-bis(α-methoxybenzyloxy)-2-butene*

One mole (157 g.) of α-chlorobenzyl methyl ether is added slowly over 45 minutes with good stirring to 450 ml. of pyridine, holding the temperature below 40° C. with external cooling. To the resulting slurry is added 22.3 g. (.25 mole) of 2-butene-1,4-diol over a ½-hour period. The mixture is heated to and held at reflux for two hours, cooled to room temperature, and filtered. The solvent is distilled off from the filtrate under 20 mm. Hg pressure, and the 1,4-bis(α-methoxybenzyloxy)-2-butene isolated by distillation at 0.1 mm. Hg pressure.

What is claimed is:

1. A process for the preparation of pyridoxine which comprises reacting an oxazole of the formula:

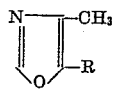

wherein R is a cyano radical or an oxy-radical of the formula OY wherein Y is an alkyl group having from 1 to 10 carbon atoms, tetrahydrofurfuryl, benzyl, phenyl ethyl, phenyl or tolyl with a compound of the formula:

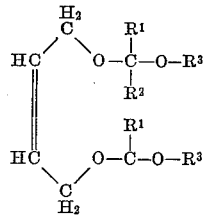

wherein $R^1$ is hydrogen, lower alkyl or phenyl; $R^2$ is hydrogen or lower alkyl; $R^3$ is lower alkyl or phenyl and wherein $R^1$ and $R^3$ can be connected together to form a tetrahydrofuryl or tetrahydropyranyl radical and then treating the resulting solution with a mineral acid in the presence of water or a lower alkanol to produce pyridoxine.

2. A process which comprises reacting an oxazole of the formula:

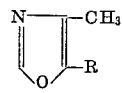

wherein R is a cyano radical or an oxy-radical of the formula OY, wherein Y is an alkyl group having from 1 to 10 carbon atoms, tetrahydrofurfuryl, benzyl, phenyl ethyl, phenyl or tolyl, with an ethylenic compound of the formula:

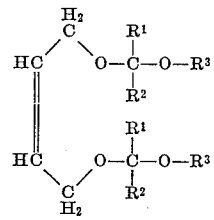

wherein $R^1$ is hydrogen, lower alkyl or phenyl; $R^2$ is hydrogen or lower alkyl; $R^3$ is lower alkyl or phenyl and wherein R1 and $R^3$ can be connected together to form a tetrahydrofuryl or tetrahydropyranyl radical to produce the corresponding pyridine compound of the formula:

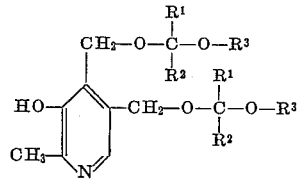

wherein $R^1$, $R^2$ and $R^3$ are as defined above.

3. A process which comprises reacting an oxazole of the formula:

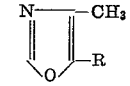

wherein R is a cyano or a lower alkoxy group with 1,4-bis-(methoxymethoxy-2-butene to form 4,5-bis(methoxymethoxymethyl)-2-methyl-3-pyridinol.

4. A process which comprises reacting an oxazole of the formula:

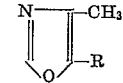

wherein R is a cyano or a lower alkoxy group with 1,4-bis-(1-methoxyethoxy)-2-butene to form 4,5-bis[(1-methoxyethoxy)-methyl]-2-methyl-3-pyridinol.

5. A process which comprises reacting an oxazole of the formula:

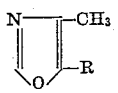

wherein R is a cyano or a lower alkoxy group with 1,4-bis-(1-ethoxyethoxy)-2-butene to form 4,5-bis[(1-ethoxyethoxy)-methyl]-2-methyl-3-pyridinol.

6. A process which comprises reacting an oxazole of the formula:

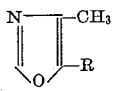

wherein R is a cyano or a lower alkoxy group with 1,4-bis-(2-tetrahydropyranyloxy)-2-butene to form 2-methyl-4,5-bis[(2-tetrahydropyranyloxy)methyl]-3-pyridinol.

7. A process which comprises reacting an oxazole of the formula:

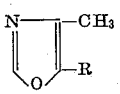

where in R is a cyano or a lower alkoxy group with 1,4-bis-(2-tetrahydrofuryloxy)-2-butene to form 2-methyl-4,5-bis[(2-tetrahydrofuryloxy)methyl]-3-pyridinol.

8. A process which comprises reacting an oxazole of the formula:

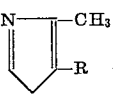

wherein R is a cyano or an oxy-radical of the formula OY, wherein Y is an alkyl group having from 1 to 10 carbon atoms, tetrahydrofurfuryl, benzyl, phenyl ethyl, phenyl or tolyl with an ethylenic compound of the formula:

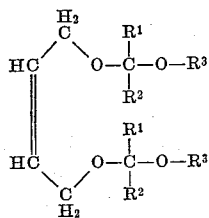

wherein $R^1$ is hydrogen, lower alkyl or phenyl; $R^2$ is hydrogen or lower alkyl; $R^3$ is lower alkyl or phenyl and wherein $R^1$ and $R^3$ can be connected together to form a tetrahydrofuryl or tetrahydropyranyl radical to produce the corresponding pyridine compound of the formula:

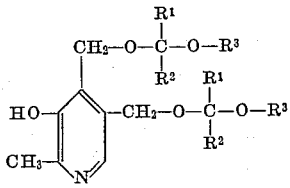

wherein $R^1$, $R^2$ and $R^3$ are as defined above and then treating the resulting pyridine compound with a mineral acid in the presence of water or a lower alkanol to form pyridoxine.

9. A process for preparing pyridoxine which comprises treating a compound of the formula:

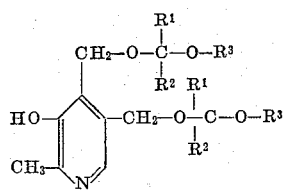

wherein $R^1$ is hydrogen, lower alkyl or phenyl; $R^2$ is hydrogen or lower alkyl; and $R^3$ is lower alkyl or phenyl and wherein $R^1$ and $R^3$ can be connected together to form a tetrahydrofuryl or tetrahydropyranyl radical with a mineral acid in the presence of water or a lower alkanol.

10. A process for the preparation of pyridoxine which comprises treating 4,5 - bis(methoxymethoxymethyl) - 2-methyl-3-pyridinol with a mineral acid in the presence of water or a lower alkanol.

11. A process for the preparation of pyridoxine which comprises treating 4,5-bis[(1-methoxyethoxy)methyl]-2-methyl-3-pyridinol with a mineral acid in the presence of water or a lower alkanol.

12. A process for the preparation of pyridoxine which comprises treating 4,5-bis[(1 - ethoxyethoxy)methyl]-2-methyl-3-pyridinol with a mineral acid in the presence of water or a lower alkanol.

13. A process for the preparation of pyridoxine which comprises treating 2-methyl-4,5-bis[(2-tetrahydropyranyloxy)methyl]-3-pyridinol, with a mineral acid in the presence of water or a lower alkanol.

14. A process for preparation of pyridoxine which comprises treating 2-methyl-4,5-bis[(2-tetrahydrofuryloxy)methyl]-3-pyridinol with a mineral acid in the presence of water or a lower alkanol.

15. A compound of the formula:

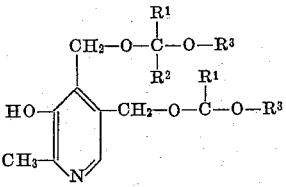

wherein $R^1$ is hydrogen, lower alkyl or phenyl; $R^2$ is hydrogen or lower alkyl; and $R^3$ is alkyl or phenyl and wherein $R^1$ and $R^3$ can be connected together to form a tetrahydropyranyl or a tetrahydrofuryl radical.

16. 4,5 - bis(methoxymethoxymethyl) - 2 - methyl-3-pyridinol.

17. 4,5 - bis[(1 - methoxyethoxy)methyl] - 2 - methyl-3-pyridinol.

18. 4,5-bis[(1 - ethoxyethoxy)methyl] - 2 - methyl-3-pyridinol.

19. 2 - methyl - 4,5-bis[(2 - tetrahydropyranyloxy)-methyl]-3-pyridinol.

20. 2 - methyl - 4,5 - bis[(2 - tetrahydrofuryloxy)-methyl]-3-pyridinol.

References Cited

UNITED STATES PATENTS 3,250,778   5/1966   Kimel et al. _____ 260—297.5

WALTER A. MODANCE, *Primary Examiner.*

A. L. ROTMAN, *Assistant Examiner.*